P. Bruso,
Electric Battery.
Nº 63,848.     Patented Apr. 16. 1867.
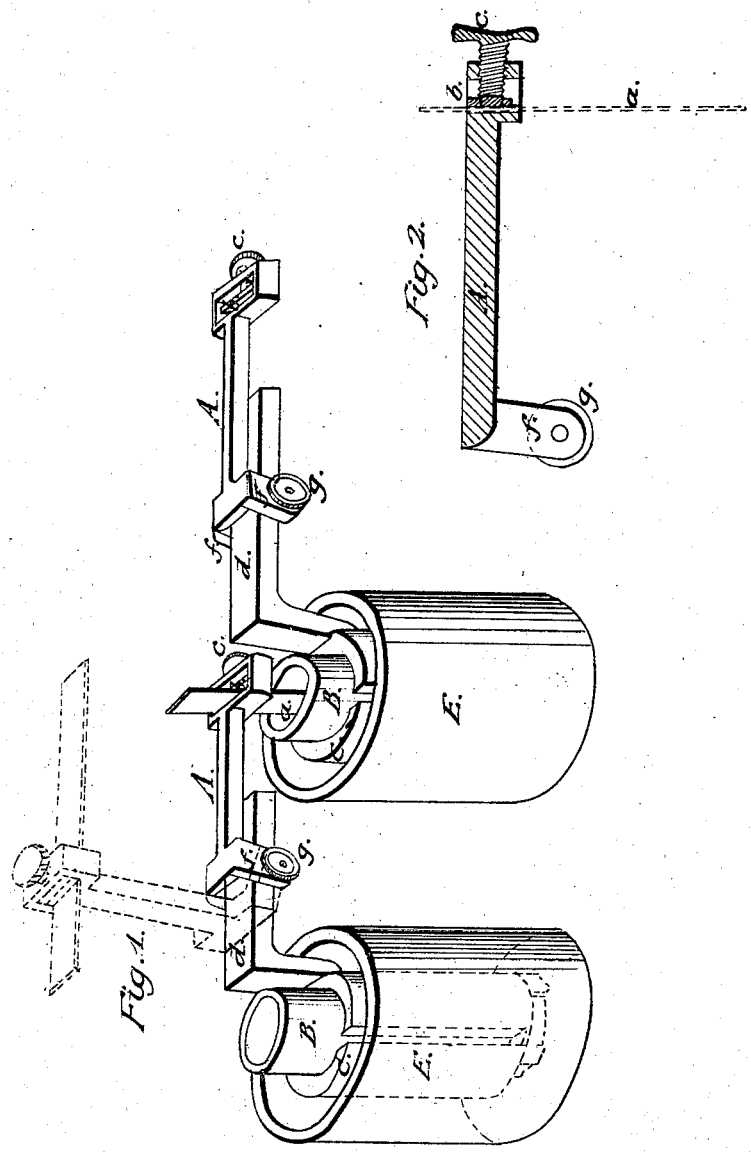
Witnesses:
Jos. Hyatt.
James A. Allen.
Inventor:
Peter Bruso.
by J. Fraser & Co.
Attys.

United States Patent Office.

PETER BRUSO, OF ERIE, PENNSYLVANIA, ASSIGNOR TO HIMSELF AND CHARLES B. CLARK, OF BUFFALO, NEW YORK.

Letters Patent No. 63,848, dated April 16, 1867.

IMPROVEMENT IN ELECTRO-MAGNETIC BATTERIES.

The Schedule referred to in these Letters Patent and making part of the same.

TO ALL WHOM IT MAY CONCERN:

Be it known that I, PETER BRUSO, of the city of Erie, in the State of Pennsylvania, have invented a new and useful Improvement in Electro-Magnetic Batteries; and I hereby declare that the following is a full and exact description thereof, reference being had to the accompanying drawings, in which—

Figure 1 is a perspective view of two cups of a Grove battery, with my improvement represented in use thereon; and Figure 2 is a longitudinal section of the arm A detached.

My improvement consists in the employment of an adjustable arm for connecting the positive with the negative metal or poles of batteries, said arm being constructed with a binding-clamp for holding the platinum, and with an adjustable yoke or jaws for connecting with the zinc; and is especially designed to be used with the Grove battery when a series of cups or cells is employed. In such batteries the platinum plate $a$, which is immersed in the acid of the porous cell B, is usually connected by soldering with a slip of copper extending to the arm $d$ of the zinc or positive metal C, to which it is also soldered. In order to replenish the acid of the porous cell the platinum plate has to be occasionally removed, which is accomplished by bending the copper connection. The frequency with which this is required causes the soldered joint, or the copper, or platinum to fracture in part or whole, and thereby interferes with or entirely stops the action of the battery; besides, as the zinc is soon dissolved, the frequency with which these connections have to be soldered anew entails a large expense.

It is the object of my invention to overcome these objections by so constructing the connection between the zinc and platinum that it may be readily changed when a new zinc or positive metal is required, and adjusted to suit the distance between the cups and the depth of immersion of the platinum, and which will also admit of the removal of the latter when the porous cell is replenished without risk or inconvenience. To this end I construct an arm, A, of brass or any suitable metal, one end of which is provided with a cross-head having a slot or opening of sufficient size in one direction to admit the platinum plate $a$. This opening contains a sliding-follower plate, $b$, which is moved by the thumb-screw $c$, by tightening which against the platinum it is held in close connection with the arm. This admits of raising or lowering the platinum by simply loosening the screw $c$. At the opposite end of the arm I provide a clamp or yoke consisting of two lugs or ears $f\,f$ projecting downwards, with sufficient space between them to receive the projecting arm $d$ of the zinc. Through one of these ears passes a thumb-screw, $g$, by tightening which the arm A and zinc are held in such close connection as to insure perfect conduction. This arrangement secures the following advantages: It admits of the platinum plate being adjusted to the distance between the several cups E E of the battery by moving the clamp $f\,f\,g$ along the horizontal arm $d$ of the zinc. It enables the platinum to be easily removed from the porous cell by raising it, as represented in red lines, fig. 1; when the arm A turns on the bearing of the clamp, the screw $g$, forming its axis, places it entirely out of the way during the replenishing of the cell. It enables the intensity of the action of the battery to be regulated by increasing or diminishing the immersion of the platinum, the arm A remaining at any angle at which it may be set. It insures perfect and uniform conduction of electricity, and prevents accidents, which sometimes arise from the soldered joint melting under the heat of the electric current when the conduction at the joint is imperfect. It greatly reduces the expenses of working the batteries of extensive telegraphic lines.

What I claim, and desire to secure by Letters Patent, is—

The adjustable connecting-arm A for the cups of electro-magnetic batteries, consisting of the pivoted attachment $f\,f\,g$ and sliding clamp for the platinum, constructed and operating substantially as set forth.

In witness whereof I have hereunto signed my name in the presence of two subscribing witnesses.

PETER BRUSO.

Witnesses:
 F. CURTZE,
 D. B. McCREARY.